US006196477B1

(12) United States Patent
Halltorp et al.

(10) Patent No.: US 6,196,477 B1
(45) Date of Patent: Mar. 6, 2001

(54) SPRAY DEVICE WITH NOZZLE AND VALVE (75) Inventors: Sven Erik Ingemar Halltorp, Falkenberg; Sven Jonas Modell, Halmstad; Jan Torgny Staffan Thuresson, Gullbrandstorp, all of (SE)

(73) Assignee: Sven Erik Ingemar Halltorp, Falkenberg (SE)

( * ) Notice: Subject to any disclaimer, the term of this patent is extended or adjusted under 35 U.S.C. 154(b) by 0 days.

(21) Appl. No.: 09/421,215

(22) Filed: Oct. 20, 1999

Related U.S. Application Data (63) Continuation of application No. PCT/SE98/00708, filed on Apr. 20, 1998.

(30) Foreign Application Priority Data

Apr. 21, 1997 (SE) .................................................... 9701502
Oct. 3, 1997 (SE) .................................................... 9703625

(51) Int. Cl.$^7$ ...................................................... B05B 1/30
(52) U.S. Cl. .......................... 239/579; 239/530; 239/537; 239/589; 251/344; 251/346; 251/347
(58) Field of Search .................................... 239/451, 452, 239/453, 456, 459, 525, 530, 532, 537, 541, 576, 579, 583, 589, DIG. 22, 570, 571; 251/341, 344, 346, 347; 222/514, 525, 529

(56) References Cited

U.S. PATENT DOCUMENTS

| 623,128 | * | 4/1899 | Bartlett | 239/579 X |
|---|---|---|---|---|
| 1,011,314 | * | 12/1911 | Canner | 239/541 |
| 1,745,323 | * | 1/1930 | Coe et al. | 239/530 X |
| 1,813,581 | * | 7/1931 | Rodrigues | 239/541 X |
| 2,758,873 | * | 8/1956 | Leisenring | 251/347 X |
| 2,760,754 | * | 8/1956 | Gladstone | 251/344 |
| 3,219,278 | * | 11/1965 | Santarelli | 239/541 X |
| 4,025,000 | * | 5/1977 | Blasnik | 239/459 |
| 4,128,209 | * | 12/1978 | Johnson | 239/530 X |
| 4,344,578 | * | 8/1982 | Shames et al. | 239/530 X |
| 4,613,074 | | 9/1986 | Schulze . | |
| 4,709,715 | * | 12/1987 | Knight | 239/588 X |
| 5,492,148 | * | 2/1996 | Goughneour et al. | 251/346 X |

FOREIGN PATENT DOCUMENTS

| 3527922 A1 | 2/1987 | (DE) . |
|---|---|---|
| 19503101 C1 | 12/1995 | (DE) . |
| 4445520 C1 | 7/1996 | (DE) . |
| 1 593 638 | 7/1981 | (GB) . |

* cited by examiner

Primary Examiner—Andres Kashnikow
Assistant Examiner—Steven J. Ganey
(74) Attorney, Agent, or Firm—Luedeka, Neely & Graham, P.C.

(57) ABSTRACT

The present invention relates to a spray device which comprises a nozzle for ejecting a jet of fluid. According to the invention, the spray device comprises a nozzle holder which is adapted to be gripped manually when using the spray device and which is movable relative to the nozzle essentially in parallel with the direction of the jet of fluid. The spray device further comprises a valve which is connected in front of the nozzle and is adapted to open when moving the nozzle holder in the direction of the jet of fluid relative to the nozzle. The nozzle is biased in the direction of the jet of fluid relative to the nozzle holder and the relative position of the nozzle holder to the nozzle is affected by the reaction power of the jet of fluid.

12 Claims, 6 Drawing Sheets

SPRAY DEVICE WITH NOZZLE AND VALVE

This application is a continuation of international application number PCT/SE98/00708, filed Apr. 20, 1998.

The present invention relates to a spray device comprising a valve and a nozzle for ejecting a jet of fluid. More specifically, the present invention relates to a spray device which can be used for cleaning by means of water and chemicals, for cleaning by means of air, for fire extinguishing, blasting, spray painting etc.

To simplify the specification, the present invention will be described based on the field of cleaning by using high-pressure sprayers, but it can of course be used for other applications in which a fluid flows through a valve. High-pressure sprayers are used industrially, for instance, when cleaning equipment in the foodstuff industry, the chemical industry etc.

There are a number of different spray devices having a nozzle and a valve and intended for high-pressure sprayers with associated control means for opening and closing the flow through the spray nozzle. A common feature of the different control means for the spray nozzles is that there must be a safety function which causes the flow to the spray nozzle to be interrupted if the user loses his grip of the spray nozzle handle. Today this safety function is so designed that the valve of the spray device opens by squeezing a control means in the form of a trigger in a loop. When the user loses his squeezing grip of the trigger, this springs back, whereby the valve closes and the jet of fluid is interrupted.

The design involving a handle with a loop and a trigger causes a great static load to the user's hand muscles when squeezing the trigger during the entire time of operation. When finishing the working day, as much as two hours may be needed for cleaning, which results in the static load on the hand muscles causing wear and industrial injuries.

To make the cleaning operation less strenuous, it happens that the safety function is eliminated by locking the trigger relative to the handle in an open position of the valve. Then the user just needs to hold the handle in a common grip and need not constantly squeeze the trigger towards the handle. If in this case the user should drop the handle in the cleaning operation, the high-pressure flow of fluid and an associated tube, through which the fluid is conducted to the spray device, may cause great damage to equipment and people standing nearby.

There are today no spray devices with nozzle and valve which provide the safety function without the design involving a trigger that is to be squeezed during the cleaning operation.

Spray devices with nozzle and valve as described above are disclosed in DE 35 27 922, DE 195 03 101, U.S. Pat. No. 4,613,074 and GB 1,593,638. A drawback of these spray devices thus is that in operation they cause great static and ergonomically incorrect load to the muscles of the hand and the forearm.

Danish Utility Model Specification 95 00285 discloses a pistol handle for high-pressure appliances and high-pressure tools. This pistol handle is characterised in that the trigger has its turning point of the activating wedge (trigger) placed behind the user's hand. With this construction, the force by which the user must press the trigger towards the handle would decrease since the hand is pressed forwards in the handle as the jet of high-pressure fluid operates. However, this construction suffers from, for instance, the drawback that the trigger must still be pressed towards the handle during the entire cleaning operation, which causes a static load to the muscles of the hand.

A further drawback of the prior-art spray devices with nozzle and valve is that the handle is not designed as a direct extension of the nozzle, which requires an unnatural position when planar surfaces are to be cleaned, which are located a distance above the plane on which the user is standing. Many users then often take a working position in which they hold the tube behind their back and across their shoulder, the handle and the nozzle being held a distance in front of their shoulder with one hand. This cannot be done with today's spray devices for high-pressure sprayers when the safety function is active.

An object of the present invention is to provide a spray device with nozzle and valve which does not have the above drawbacks.

Other objects, features and advantages of the present invention will appear from the following specification.

These objects are achieved by a spray device with nozzle and valve according to appended claim 1. Particularly preferred embodiments are defined in the dependent claims.

In brief, the present invention concerns a spray device comprising a valve and a nozzle for ejecting a jet of fluid. According to the invention, the spray device has a nozzle holder 6; 6, 15, 16, 19, which is adapted to be gripped manually when using the spray device and which is movable relative to the nozzle essentially in parallel with the direction of the jet of fluid. The spray device further comprises a valve, which is connected in front of the nozzle and is adapted to be opened when moving the nozzle holder in the direction of the jet of fluid relative to the nozzle. The nozzle is biased in the direction of the jet of fluid relative to the nozzle holder 6, and the relative position of the nozzle holder to the nozzle is affected by the reaction power of the jet of fluid.

In a preferred embodiment of the present invention, a pressure spring is compressed between the nozzle and the nozzle holder to effect the bias.

The nozzle holder may comprise a sleeve, which by moving in the direction of the jet of fluid is adapted to open the valve.

An advantage of the present invention is that it does not cause static load and, thus, wear to the muscles of the hand and the forearm. A preferred embodiment of the present invention further has the advantage that the nozzle holder on the spray device is a direct extension of the nozzle. This embodiment of the present invention can thus be operated in a comfortable manner also when cleaning surfaces which are positioned above the plane on which the user is standing.

Preferred embodiments of the invention will be described below with reference to the accompanying drawings. The drawings are not to be considered to limit the scope of the present invention.

The embodiments of the present invention shown in FIGS. 1a, 1b, 3a and 3b comprise a spindle 1 with axial, non-connected bores 2, 3. The bores 2, 3 lead to openings 4, 5 in the outside of the spindle 1. The openings 4, 5 comprise in this embodiment radial openings from the bores 2, 3 out to the side of the spindle 1, but can also be designed in other ways that are obvious to one skilled in the art. The spray device according to FIGS. 1 and 3 further comprises a nozzle holder in the form of a sleeve 6, which is movable on the spindle 1. The sleeve 6 has an axially extended portion 7 with an increased inner radius. This portion can extend along the circumference of the spindle 1, but can also have a circumferential width corresponding to the openings 4, 5 and constitute one or more connections depending on the number of openings 4, 5.

The distance between the openings 4, 5 does not exceed the length of the portion 7 with an increased inner radius. Between the openings 4, 5, a lug 8 is arranged on the spindle 1. When the valve remains in its closed position, as in FIG. 1a, the lug 8 is adapted to engage an end wall 9 in the portion 7 with an increased radius. Like in FIGS. 1a, 1b, 3a and 3b, this lug 8 may comprise a packing, but may also comprise a lug arranged in the material of the spindle 1. If the lug 8 is arranged in the material of the spindle 1, a packing can be arranged in the sleeve 6 instead of in the spindle 1.

The spray device shown in FIGS. 1a, 1b, 3a and 3b further comprises a helical spring 10 compressed between a nozzle (1a) which is fixed relative to the spindle 1, and the sleeve 6 to effect a bias which strives to displace the spindle 1 and the nozzle 1a in the direction of arrow A relative to the sleeve 6. Between the sleeve 6 and the spindle 1, sealing packages are arranged, which comprise an O ring 11 and a Teflon ring 12. These sealing packages can be arranged in the sleeve 6, as shown in FIGS. 1a, 1b, 2a and 2b, but can also be arranged in the spindle 1, as shown in FIGS. 3a, 3b, 4a and 4b. When opening the spray device, the sleeve 6 is moved axially in the direction of the helical spring 10, thereby forming a connection between the two bores 2, 3. The pressurised fluid flows through the bore 3, out of the spindle via the openings 4 and into the portion 7 with an increased inner radius in the sleeve 6, further through the openings 5 into the bore 2 and out through the nozzle 1a. When a certain flow through the valve has been built up and the user holds the sleeve, the reaction power of the jet of fluid exerted on the nozzle 1a will be greater than the power than the helical spring 10 applies to the sleeve 6 relative to the nozzle 1a. The spray device is thus kept in its open position by means of the reaction power of the jet of fluid as long as someone holds the sleeve 6. When the user loses his grip of the sleeve 6, the reaction power is no longer absorbed by the sleeve 6 and thus, there is nothing to counteract that the sleeve 6 is pushed backwards to a closed valve position by the helical spring 10.

Figure 5A:
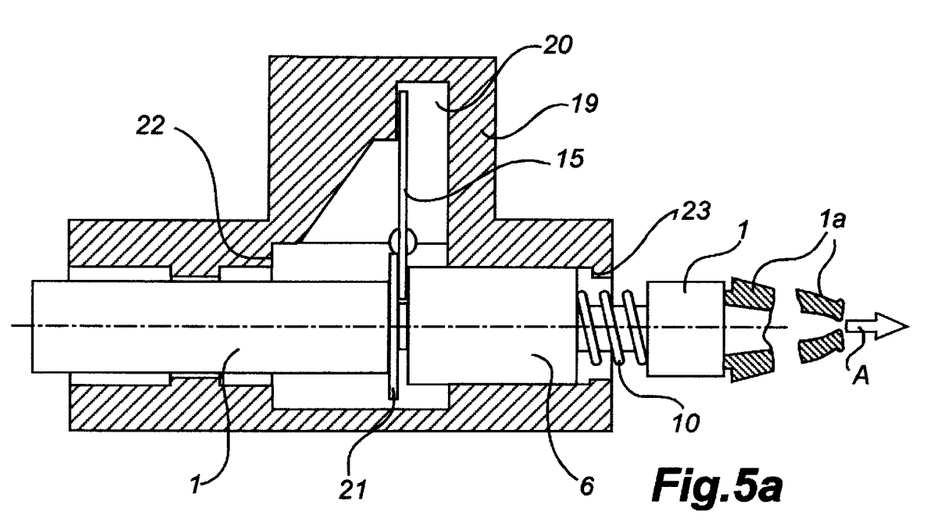
FIG. 5a is a part-sectional side view of a further embodiment of the present invention, the valve being shown in a closed position.
Figure 5B:
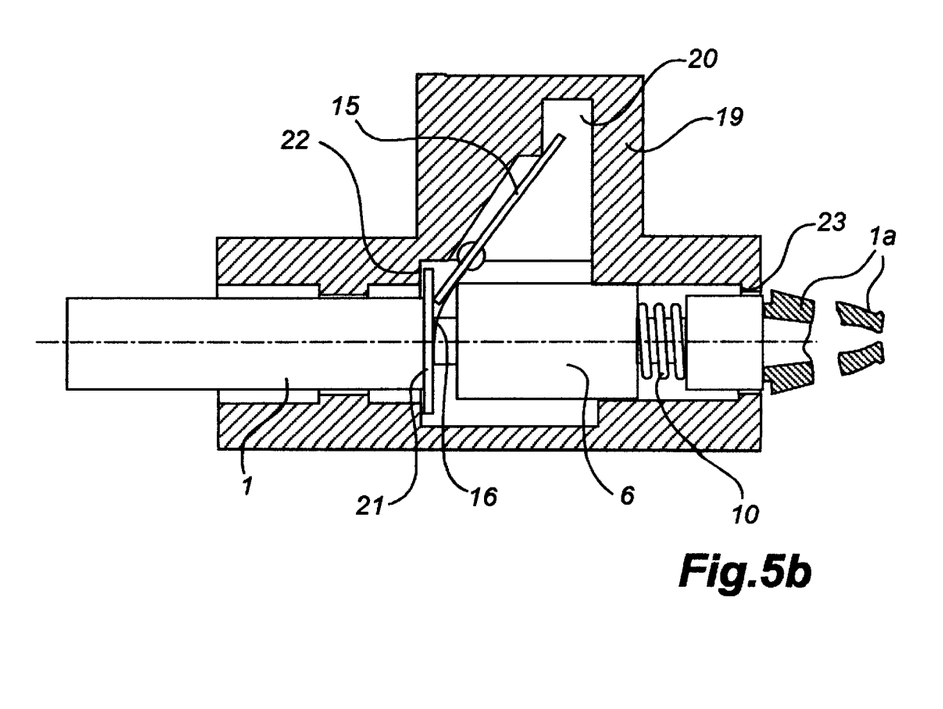
FIG. 5b is a part-sectional side view of the same embodiment as in FIG. 5a, but the valve is shown in an open position.
Figure 6:
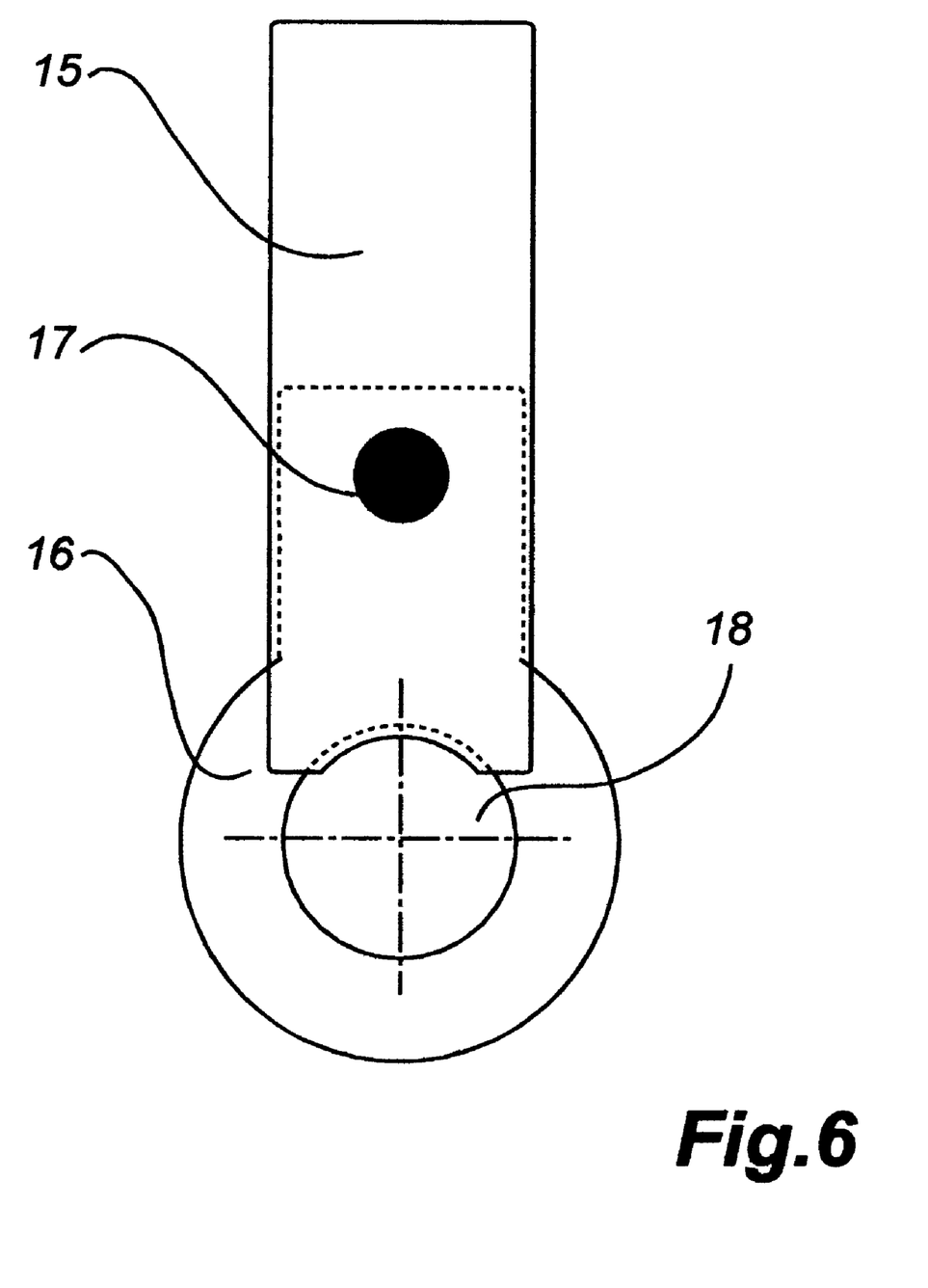
FIG. 6 is a front view of a detail of the embodiment shown in FIGS. 5a and 5b.

The more the spring 10 is biased the better safety is obtained, but is must not be biased to such an extent in the open position of the valve that the sleeve 6 when operated is pushed back by the spring power in spite of the reaction power exerted by the jet of fluid on the nozzle 1a. To be able to compress the spring 10 to a greater degree than allowed by the reaction power of the jet of fluid, it is possible, as shown in FIGS. 5a and 5b, to arrange a gear lever 15, 16, which, in opening, neutralises the extra spring force that is supplied by the spring 10. In the embodiment shown in FIGS. 5a, 5b and 6, the gear lever 15, 16 comprises a crowbar 15, which acts as a lever and is fixedly arranged on a piece of spring steel 16 by means of a rivet 17. The piece of spring steel 16 has a recess 18, the diameter of which is somewhat larger than the outer diameter of the spindle 1 for receiving the spindle 1. The gear lever 15, 16 can, of course, be designed in other ways that are obvious to those skilled in the art.

In the embodiment of the present invention shown in FIGS. 5a and 5b, a handle 19 is displaceably arranged in the periphery of the spindle 1 and the sleeve 6. The handle 19 has a recess 20 for receiving the gear lever 15, 16. The recess 20 is designed such that the displacement of the handle 19 in the direction of the jet of fluids affects the gear lever 15, 16 which in turn affects the sleeve 6, which is moved towards the open position of the valve. The piece of spring steel 16 causes the crowbar 15 to be held in place relative to the spindle 1, and the movement of the piece of spring steel 16 over the length of the spindle 1 is limited by a stop lug 21 arranged on the spindle 1. The stop lug 21 also constitutes an abutment surface for the crowbar 15 when opening the valve. The stop lug 21 can also be arranged to engage, when the handle 19 is moved in the direction of the jet of fluid, a wall 22 formed in the recess 20, which results in a limitation of the movability of the handle 19 relative to the spindle 1. Moreover, there may be arranged in the handle 19 in front of the sleeve 6 in the direction of the nozzle (1a) one more stop lug 23 which is adapted to engage the front edge of the sleeve 6 to determine the resting position of the handle 19 relative to the sleeve 6 and especially the gear lever 15, 16.

Thus, the gear lever 15, 16 generally constitutes some sort of gear, which is adapted to transform a movement of the handle 19 relative to the nozzle 1a and the spindle 1 in the direction of the jet of fluid into a smaller movement of the sleeve 6 relative to the nozzle 1a and spindle 1 in the same direction. In this embodiment, the nozzle holder thus comprises the handle 19, the gear/gear lever 15, 16 and the sleeve 6.

A different technique to be able to compress the spring to a greater extent than allowed by the reaction power of the jet of fluid is to arrange magnets in the seat 14 of the spring closest to the nozzle and at the edge of the sleeve 6 closest to the nozzle. This magnetic force neutralises the extra spring force that the compressed spring 10 exerts in addition to the force that is neutralised by the reaction power of the jet of fluid. As long as the user holds the sleeve 6, the magnetic force and the reaction power of the jet of fluid will hold the sleeve 6 in a position where the valve is kept open. When the user drops the sleeve 6, the spring force will neutralise the magnetic force and when the magnets have been moved apart a distance, no magnetic force is obtained, and the spring force presses the sleeve 6 backwards with maximum force, thereby closing the valve.

The embodiments of the present invention shown in FIGS. 2a, 2b, 4a and 4b after from the embodiments shown in FIGS. 1a, 1b, 3a and 3b in such a manner that the spindle 1 has an increase in radius in the direction of the jet of fluid between the openings 4, 5. This increase in radius can be present anywhere between the two sealing packages 11, 12.

This design compensates for the pressure-dependent friction that is to be overcome in automatic closing of the spray device when the user drops the sleeve 6 or releases his hold of the sleeve 6 since the pressure-absorbing area in the direction of the jet of fluid is smaller than the pressure-absorbing area in the opposite direction.

This is obvious from the embodiments shown in FIGS. 2a, 2b, 4a and 4b since the increase in radius is so great that the radius of the sleeve 6 changes correspondingly. The end wall 9 has a much smaller area than the end wall 13. The increase in radius of the spindle 1 need not be so drastic as shown in FIGS. 2a, 2b, 4a and 4b but can be so small that the inner radius of the sleeve 6 on either side of the portion 7 with an increased radius can be constant for the entire sleeve 6. The pressure-absorbing area depends generally on how great the distance is between the portion 7 with an increased inner radius and the surface of the spindle 1 adjacent to the front and rear sealing packages 11, 12.

Figure 1A:
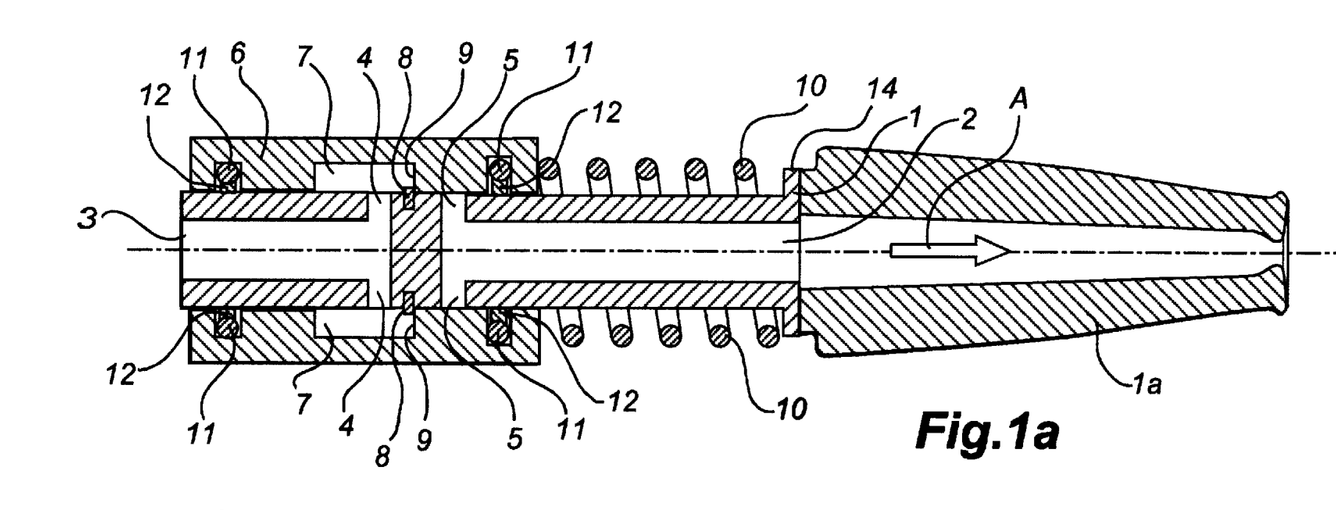
FIG. 1a is a sectional view of a preferred embodiment of the present invention, the valve being shown in a closed position.
Figure 1B:
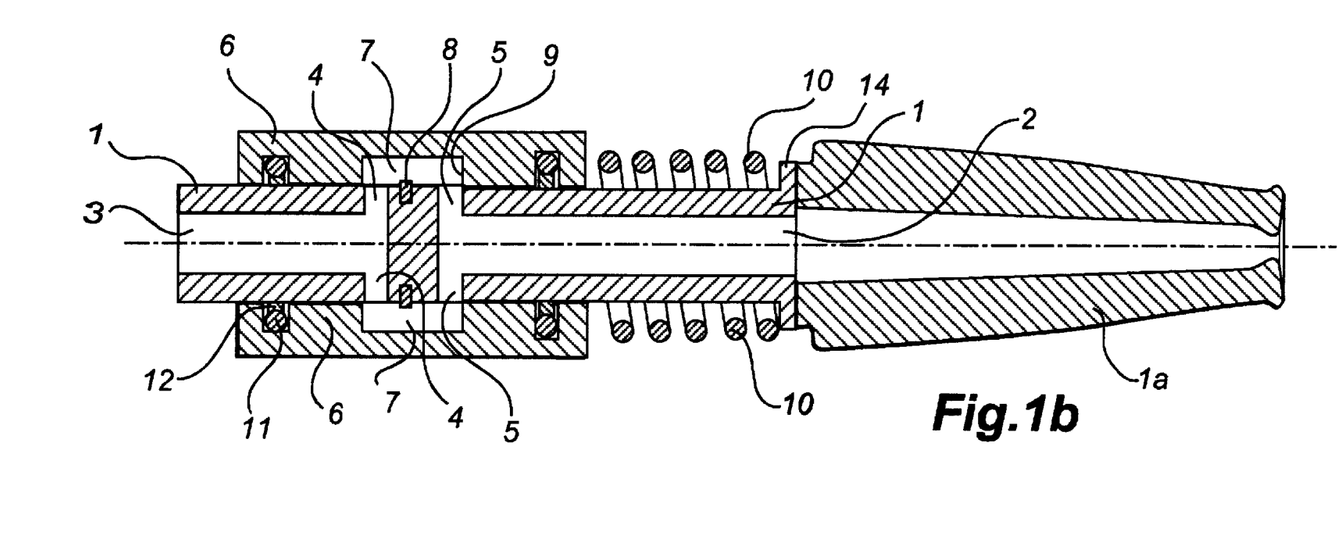
FIG. 1b is a sectional view of the same embodiment as in FIG. 1a, but the valve is shown in an open position.
Figure 2A:
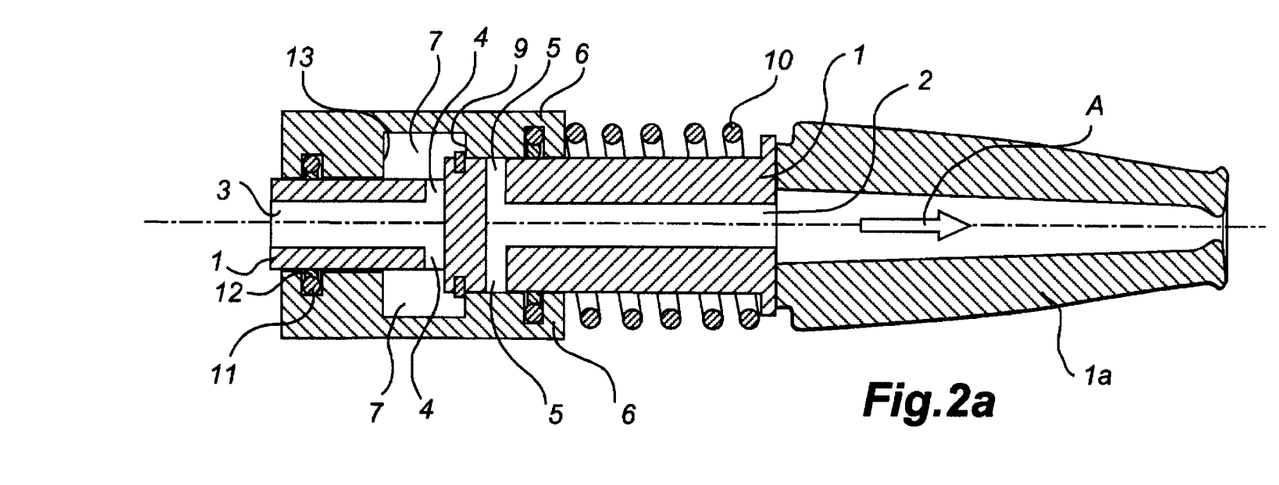
FIG. 2a is a sectional view of a further preferred embodiment of the present invention, the value being shown in a closed position.
Figure 2B:
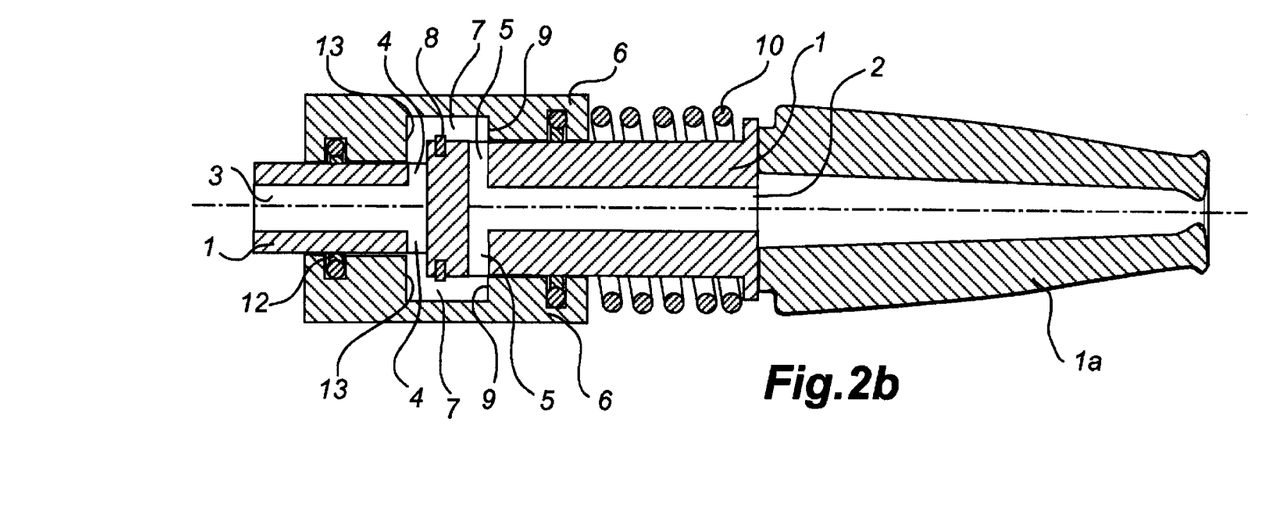
FIG. 2b is a sectional view of the same embodiment as in FIG. 2a, but the valve is shown in an open position.
Figure 3A:
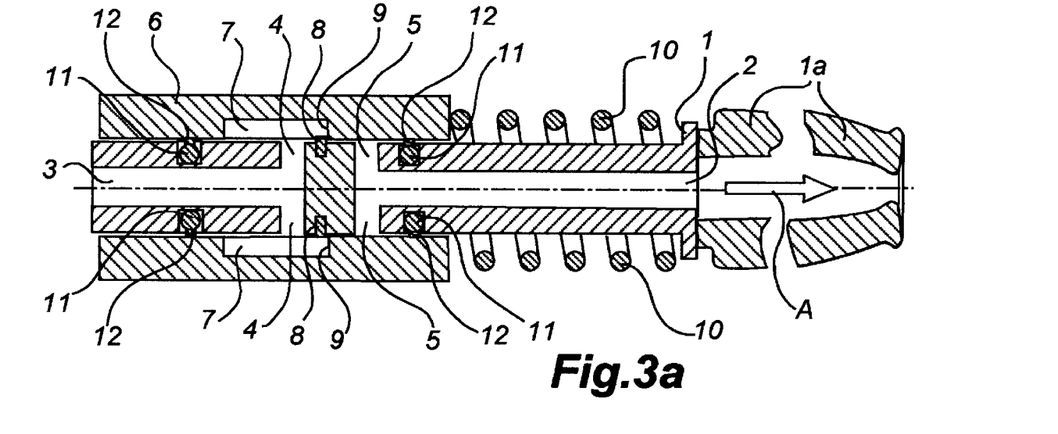
FIG. 3a is a sectional view of a further embodiment of the present invention, the valve being shown in a closed position.
Figure 3B:
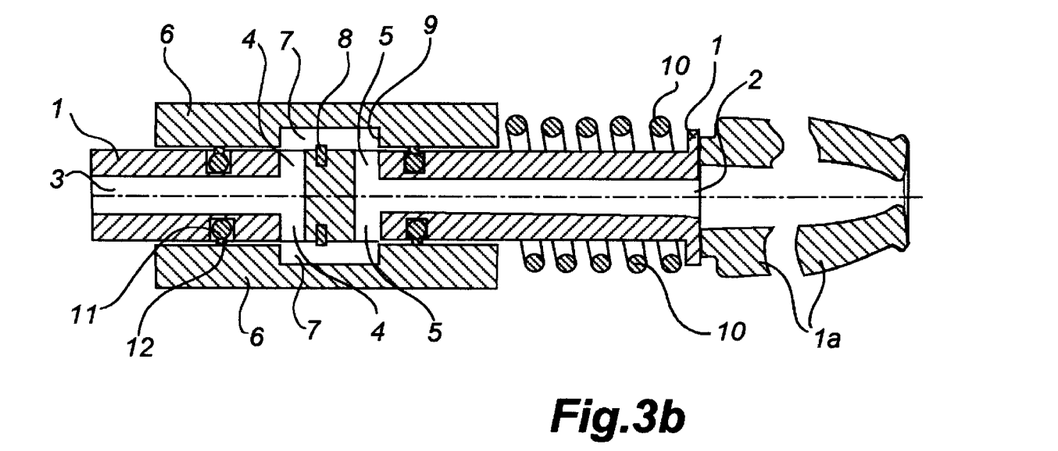
FIG. 3b is a sectional view of the same embodiment as in FIG. 3a, but the valve is shown in an open position.
Figure 4A:
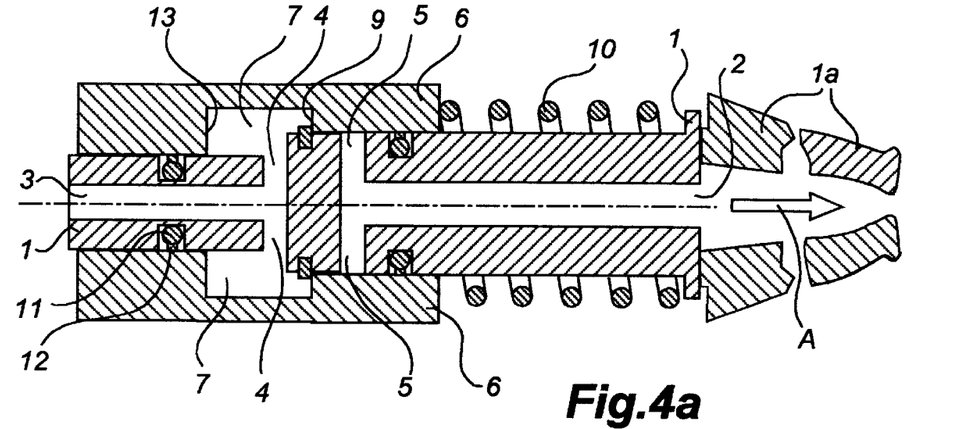
FIG. 4a is a sectional view of one more embodiment of the present invention, the valve being shown in a closed position.
Figure 4B:
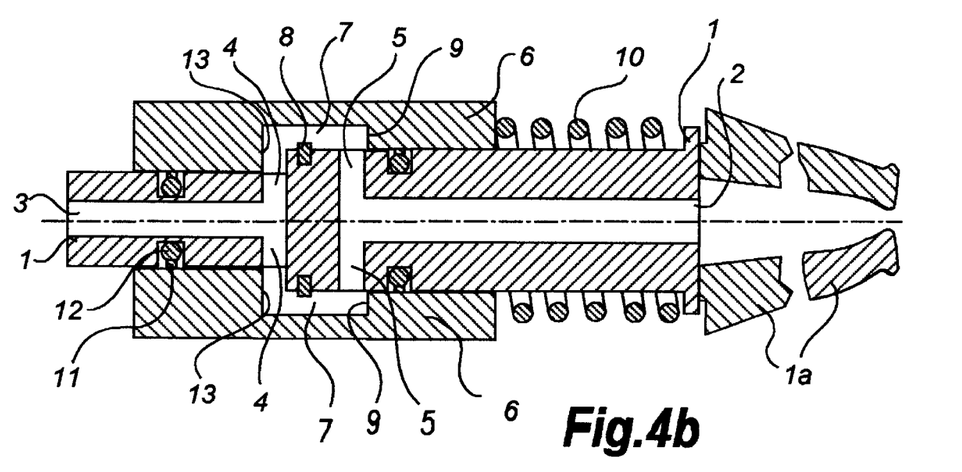
FIG. 4b is a sectional view of the same embodiment as in FIG. 4a, but the valve is shown in an open position.

With the embodiment shown in FIGS. 4a and 4b having the sealing packages 11, 12 arranged in the spindle 1, the spindle 1 can have a constant diameter while the inner radius of the sleeve 6 after the portion 7 with an increased radius in the direction of the nozzle 1a can be greater than the inner radius of the sleeve 6 before the same portion 7, thereby achieving with different pressure-absorbing areas the same effect as above.

The spray device with nozzle and valve according to the present invention thus has the advantages of not causing any static load, and therefore it does not cause wear to arise in forearms and hands.

What is claimed is:

1. A spray device comprising a nozzle having a front portion for ejecting a jet of fluid from the front portion of the nozzle in a direction, a nozzle holder which may be gripped manually when using the spray device and being movable relative to the nozzle essentially in parallel with the direction of the jet of fluid, the nozzle holder further forming a portion of a valve assembly which opens by moving the nozzle holder in the direction of the jet of fluid relative to the nozzle, the nozzle being biased in the direction of the jet of fluid relative to the nozzle holder, while the nozzle and nozzle holder are urged together by the reactive power of the jet of fluid in opposition to said bias, wherein the reactive power of the jet of fluid counterbalances the bias extended against the nozzle in the direction of the jet of fluid such that, once opened, the valve assembly remains substantially open as the nozzle holder is grasped by an operator.

2. A spray device as claimed in claim 1, wherein the nozzle is biased by a pressure spring compressed between the nozzle and the nozzle holder.

3. A spray device comprising an elongate nozzle having a front portion for ejecting a jet of fluid from the front portion of the nozzle in a first direction, the ejecting of fluid producing a counterforce on the nozzle urging it to move in a second direction opposite that of the first direction, a nozzle holder comprising an elongate sleeve, within which a back portion of the nozzle is slidably received for longitudinal sliding movement in the first and second directions, wherein the nozzle holder is configured to be gripped manually when using the spray device, the sleeve forming in combination with the back portion of the nozzle a valve assembly which opens by sliding movement of the back portion of the nozzle within the sleeve so as to provide fluid flow communication through the valve and into the front portion of the nozzle for ejecting fluid therefrom as aforesaid thereby causing the counterforce on the nozzle, the same being biased in the first direction in opposition to the counterforce, wherein the valve may be opened by relative movement of the nozzle and sleeve in opposite directions parallel to the first and second directions and is caused to remain open by the bias applied to the nozzle in opposition to the counterforce so long as the nozzle holder is gripped so as to provide a further force in addition to the bias against the counterforce.

4. A spray device as claim in claim 3, wherein the valve assembly includes a spindle with axial, non-connected bores which lead to openings in the outside of the spindle and wherein the sleeve is movable on the spindle and has a connection to connect, when moving in the direction of the jet of fluid relative to the nozzle, the two bores to each other.

5. A spray device as claimed in claim 4, wherein the nozzle holder also comprises a handle axially displaceably arranged in the periphery of the spindle and the sleeve and a gear lever arranged behind the sleeve seen in the direction of the jet of fluid, the handle having a recess for receiving the gear lever and the recess adapted in the handle, when moving the handle in the direction of the jet of fluid, to engage the gear lever on a wall of the handle defining a part of the recess so as to cause the gear lever to push the sleeve forwards to the open position of the valve.

6. A spray device as claimed in claim 5, wherein the gear lever comprises a crowbar arranged on a piece of spring steel, the end of the piece of spring steel opposite to the crowbar having a recess for receiving the spindle.

7. A spray device as claim in claim 4, wherein the connection of the sleeve includes a pressure-absorbing area of the connection in a direction opposite the direction of the jet of fluid so as to produce a valve closing force when the nozzle holder is released.

8. A spray device as claimed in claim 7, wherein the spindle has an increase in radius in the direction of the jet of fluid between the pressure-absorbing areas.

9. A spray device as claimed in claim 4, wherein the sleeve has opposite ends and includes an axially extended portion between the ends with an increased inner radius, the distance between the openings not exceeding the length of the portion with an increased inner radius.

10. A spray device as claimed in claim 9, further comprising a lug projecting from the spindle and arranged between the openings in the outside of the spindle, said lug being adapted to engage an end wall of the axially extended portion with an increased inner radius when the valve is closed.

11. A spray device as claimed in claim 10, wherein the lug comprises a packing arranged on the spindle.

12. A spray device as claimed in claim 3, wherein the nozzle holder further comprises a handle movable essentially in parallel with the direction of the jet of fluid and a gear adapted to transform a movement of the handle relative to the nozzle in the direction of the jet of fluid into a smaller movement of the sleeve relative to the nozzle in the same direction.

* * * * *

UNITED STATES PATENT AND TRADEMARK OFFICE
CERTIFICATE OF CORRECTION

PATENT NO.    : 6,196,477 B1
DATED         : March 6, 2001
INVENTOR(S)   : Sven Erik Ingemar Halltorp, et al.

It is certified that error appears in the above-identified patent and that said Letters Patent is hereby corrected as shown below:

Column 4,
Line 61, after "4b", delete "after" and insert therefor -- differ --.

Column 6, claim 5,
Line 19, after "handle" insert -- , the handle being --.
Line 21, after "lever" insert -- which is --.
Line 23, after "and" insert -- wherein --.
Line 23, after "recess", delete the word "adapted".
Line 24, after the word "fluid," insert -- is adapted --.

Column 6, claim 7,
Line 32, after "as" delete "claim" and insert -- claimed --.
Line 33, after the word "area" insert -- in the direction of the jet of fluid smaller than a pressure absorbing area --.

Signed and Sealed this

Sixth Day of November, 2001

*Attest:*

NICHOLAS P. GODICI
*Attesting Officer*     Acting Director of the United States Patent and Trademark Office